United States Patent
Sinclair et al.

(10) Patent No.: US 11,500,053 B2
(45) Date of Patent: Nov. 15, 2022

(54) RADIO FREQUENCY DETECTION AND LOCALIZATION USING AUGMENTED REALITY DISPLAY

(71) Applicants: Jessica A. Sinclair, Moncks Corner, SC (US); George Dewey Greenway, Mt. Pleasant, SC (US); Shaun Christopher Easler, Moncks Corner, SC (US)

(72) Inventors: Jessica A. Sinclair, Moncks Corner, SC (US); George Dewey Greenway, Mt. Pleasant, SC (US); Shaun Christopher Easler, Moncks Corner, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 873 days.

(21) Appl. No.: 16/396,488

(22) Filed: Apr. 26, 2019

(65) Prior Publication Data
US 2020/0025856 A1    Jan. 23, 2020

Related U.S. Application Data

(60) Provisional application No. 62/663,023, filed on Apr. 26, 2018.

(51) Int. Cl.
*G01S 3/04* (2006.01)
*H01Q 21/28* (2006.01)
(Continued)

(52) U.S. Cl.
CPC .............. *G01S 3/046* (2013.01); *G01S 3/043* (2013.01); *G06F 3/012* (2013.01); *H01Q 1/1235* (2013.01);
(Continued)

(58) Field of Classification Search
CPC ....................................................... G01S 3/046
See application file for complete search history.

(56) References Cited

U.S. PATENT DOCUMENTS

| | | | |
|---|---|---|---|
| 2014/0055490 A1 | 2/2014 | Mule et al. | |
| 2014/0218240 A1* | 8/2014 | Kpodzo | G01S 3/043 342/450 |
| 2017/0249833 A1* | 8/2017 | Shroat | H04Q 9/00 |

FOREIGN PATENT DOCUMENTS

CN        207937594 U       10/2018

OTHER PUBLICATIONS

Lien, B., Using Augmented Reality to Visualize Signal Strength Data, https://medium.com/.../using-augmented-reality-to-visualize-signal-strength-data-2009 . . . , Feb. 13, 2019.
(Continued)

*Primary Examiner* — Hsinchun Liao
(74) *Attorney, Agent, or Firm* — Naval Information Warfare Center Atlantic; Kyle Eppele; Arthur K. Samora

(57) ABSTRACT

A radiofrequency (RF) localization system can include an RF sensing component, a signal-processing module and a visualization element. A plurality of antennas mounted on a belt, or on a helmet, or at least one extendable antenna attached within a backpack could be used for the RF sensing component. The signal-processing module can receive an RF Signal-of-Interest (SOI), and can further compute localization information for the RF SOI such as line of bearing, signal-to-noise ratio (SNR), and SSID information. The visualization element can be an augmented reality (AR) visor mounted on the helmet, or AR glasses. The signal-processing module can be mounted to the helmet, visor, or glasses, as applicable. The RF sensing component, signal module and said visualization element can be worn by the
(Continued)

user, and can cooperate to provide hands free RF localization information in an AR format to an end user.

20 Claims, 4 Drawing Sheets

(51) Int. Cl.
    *H04W 48/16*     (2009.01)
    *G06F 3/01*     (2006.01)
    *H01Q 1/12*     (2006.01)
    *H04L 67/75*     (2022.01)

(52) U.S. Cl.
    CPC ............. *H01Q 21/28* (2013.01); *H04L 67/75* (2022.05); *H04W 48/16* (2013.01)

(56) References Cited

OTHER PUBLICATIONS

Maloney, D., Smartphone App Uses AR to Visualize the RF Spectrum, https://hackaday.com/2019/01/09/smartphone-app-uses-ar-to-visualize-the-rf-spectrum/, Jan. 9, 2019.
Tsarik, I., Mobile Augmented Reality WiFi AP Direction Finder, https://www.indiegogo.com/projects/mobile-augmented-reality-wifi-ap-direction-finder#/, Jul. 2017.
Unknown, Detecting GPS Jammers in Augmented Reality, RTL-SDR.com, https://www.rtl-sdr.com/detecting-gps-jammers-in-augmented-reality/. May 16, 2018.

\* cited by examiner

RADIO FREQUENCY DETECTION AND LOCALIZATION USING AUGMENTED REALITY DISPLAY

CROSS-REFERENCE TO RELATED APPLICATIONS

This application claims the benefit of U.S. Provisional Patent Application Ser. No. 62/663,023 filed Apr. 26, 2018, entitled "Holographic Spectral Display", the contents of which are fully incorporated by reference herein.

FEDERALLY SPONSORED RESEARCH AND DEVELOPMENT

This invention is assigned to the United States Government and is available for licensing for commercial purposes. Licensing and technical inquiries may be directed to the Office of Research and Technical Applications, Naval Information Warfare Center, Atlantic, Code 70F00, North Charleston, S.C., 29419-9022; voice (843) 218-3495; email ssc_lant_T2@navy.mil; reference Navy Case Number 108142.

FIELD OF THE INVENTION

This invention pertains generally to radiofrequency (RF) detectors. More particularly, the invention pertains to RF detectors that can be worn by the user and that can operate in a hands free fashion. The invention is particularly, but not exclusively, useful as a wearable, hands free RF detector which can provide an output to the end user that can be superimposed over the end user field of vision using augmented reality (AR) techniques.

BACKGROUND OF THE INVENTION

The United States Navy operates in a dense radio frequency (RF) environment. However, there may often be occasions where it can be desired to operate in an RF free environment, or in an environment where portions of the RF spectrum must be secured for certain periods of time. One such example could be during the transfer of munitions that may be sensitive to certain portions of the RF spectrum. Another example could be when the United States Naval vessel commanding officer imposes a communications blackout for tactical or operational security reasons. Still other reasons could be situations where shipboard repairs must be accomplished in the RF emission path, and the RF emission must be secured for personnel safety (radiation hazard, or RADHAZ) reasons. Worker aloft scenarios for antenna maintenance are one such example, among many.

In these situations, once the RF emission control condition is set, it can be advantageous to continually monitor compliance status of the RF emission control posture. Current own force monitoring operations can be typically accomplished by trained users/subject matter experts, who can be familiar with both radio frequency signals collection and the shipboard equipment that is generating the RF signal. But in some cases, it may be advantageous for users with little or no radio frequency signal training to be able to find signal emitters. And even with trained users, it may be desirable for the trained user to have his/her hands free to accomplish the work requiring the expertise, instead of holding the equipment that monitors the RF emission control status that is a perquisite to the work being accomplished. The "worker aloft" scenario cited above is one such scenario.

Additionally, localizing radio frequency emitters can often be critical for setting emission control, detecting adversary or hostile forces and locating targets. Currently, a well-trained operator must examine a multitude of sources to determine active signals. Further, none of these sources overlay signal information in the augmented world or analogous display with graphical information indicating origin of signal. And still further, the display is often on the handheld device, in the prior art. This can be extremely disadvantageous for the warfighter, as the warfighter will almost certainly need to use his/her hands in engaging hostile forces. Additionally, Displaying RF information and signal direction finding (DF) data in an augmented reality (AR) display will allow sailors to localize emission control violations while maintaining situational awareness (SA) without distracting their focus by looking away to a display peripheral such as laptops or handheld device displays.

In view of the above, it can be an object of the present invention to provide an RF detection and localization system that can provide the user with a line of bearing to an RF source that is radiating. Another object of the present invention can be to provide an RF detection and localization system that can be worn by the user, and that can be operated in a hands free mode. Yet another object of the present invention can be to provide an RF detection and localization system that can provide the user with a display output in an Augmented Reality format, with the system output superimposed over the end user field of vision. Still another object of the present invention can be to provide an RF detection and localization system that can use signal-to-noise (SNR) ratios to convert the RF line of bearing into an RF location bearing and range, relative to the end user. Another object of the present invention can be to provide an RF detection and localization system that can be easy to manufacture in a cost-effective manner, and that can be easy to use by an end user with very little to no training.

SUMMARY OF THE INVENTION

A radiofrequency (RF) localization system according to several embodiments of the present invention can include an RF sensing component for receiving an RF signal of interest (SOI) and a signal-processing module. The signal-processing module can receive the RF SOI and can further compute localization information for the RF SOI such as line of bearing, signal to noise ratio (SNR), SSID information, and the like, using programs such as GNU Radio or RED-HAWK®. Other computer programs with similar functionality could be used. The systems can further include a visualization element for receiving the RF SOI localization information as an input and displaying that localization information in an end user field of view (FOV).

The RF sensing component, signal module and said visualization element can all be adapted for wearing by an end user, which can allow for a portable system which can be operated by an end user pedestrian. The system components can be configured as wearable items, which can allow for hands free operation of the RF localization system while the end user is walking around using the system. In some embodiments, the RF sensing component can include a helmet and a plurality of RF antennas arranged on the helmet as an array to provide omni-directional coverage for detection and reception of the RF SOI. Other embodiments can include a belt, with the plurality of RF antennas arranged on the belt as an array to provide the omni-directional coverage. Still other embodiments can include a backpack, and a telescopic pole attached to the backpack at one end, and at least one RF antenna can be attached to the other end. The telescopic pole can be selectively extended and retracted to provide the omni-directional coverage. Some of the embodiments of the systems and methods can further include a visualization element that can be an augmented reality (AR) visor mounted on said helmet, or specialized augmented AR glasses. The signal-processing module can be further mounted to the helmet, visor, or glasses, as applicable.

BRIEF DESCRIPTION OF THE DRAWINGS

The novel features of the present invention will be best understood from the accompanying drawings, taken in conjunction with the accompanying description, in which similarly-referenced characters can refer to similarly-referenced parts, and in which.

DETAILED DESCRIPTION OF SOME EMBODIMENTS

Figure 1:
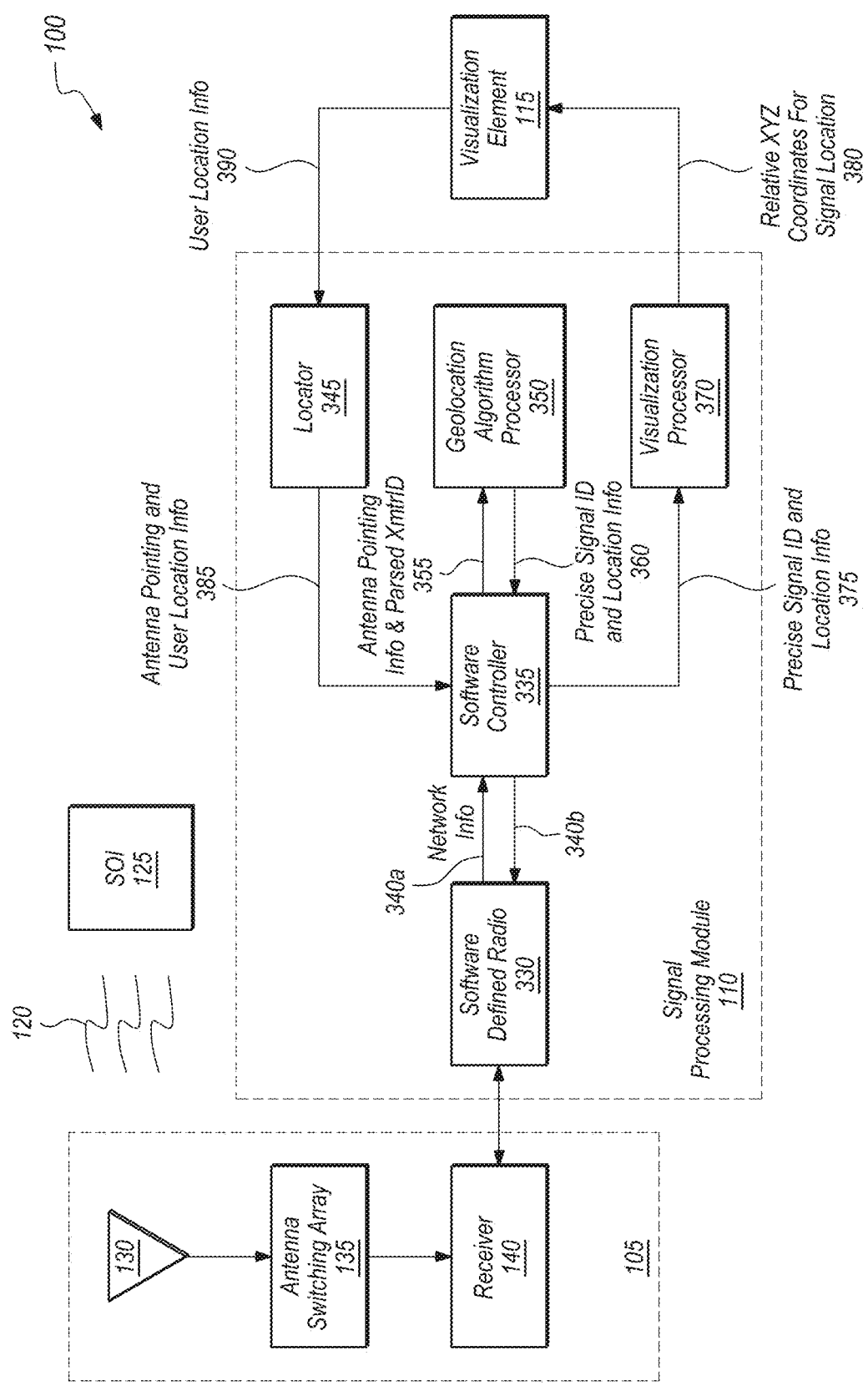
FIG. 1 can show a block diagram, which can depict the radiofrequency (RF) localization systems of the present invention according to several embodiments.

Referring initially to FIG. 1, a block diagram illustrating components of an embodiment of a system 100 in accordance with the system and methods disclosed herein is shown. System 100 can represent a specific embodiment of the embodiments disclosed herein used for detection and localization of RF signals. As shown, system 100 can include a radiofrequency (RF) sensing component 105, a signal-processing module 110 and a visualization element 115. RF sensing component 105 can detect signals 120 from an emitter of interest 125, and forward the signal detection to signal-processing module 110. Signal-processing module 110 can convert the signal detection into localization information relative to the end user (not shown in FIG. 1), and can forward the conversion output to be received as input into visualization element 115. The manner in which this can occur and the structure for accomplishing the conversion can be described more fully below.

In some embodiments, the sensing component 105 can further include a plurality of antennas 130, which can be mounted on a wearable device, such as a helmet or a backpack, to enable the end user to operate hands free (As used herein, the term "hands free" means that none of the components of the present invention are physically located in the end user's hands at any point during operation of the device). In some embodiments, the antenna array may comprise at least four antennas 130, which can be arranged as an antenna array 135 and can be connected to a receiver 140, in order to locate a line of bearing for a signal 120, the RF signal of interest (SOI). If multiple antennas detect the RF SOI, the line of bearing can be triangulated to obtain a line of bearing of the RF SOI relative to the system 100.

Figure 2A:
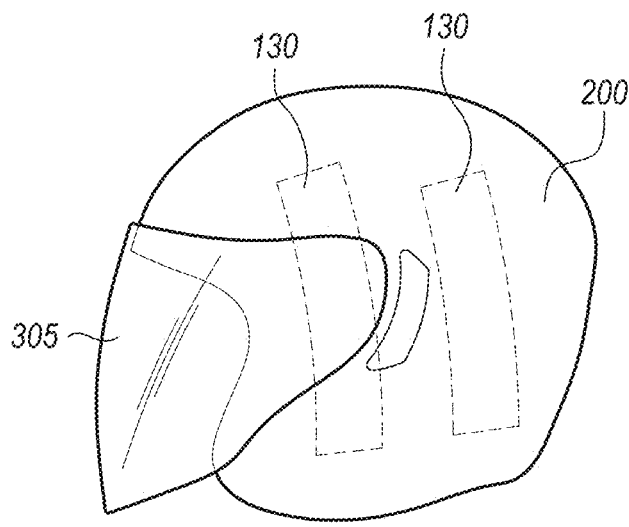
FIG. 2A can be a diagram, which can show one embodiment of the RF sensing component for the system of FIG. 1.
Figure 2B:
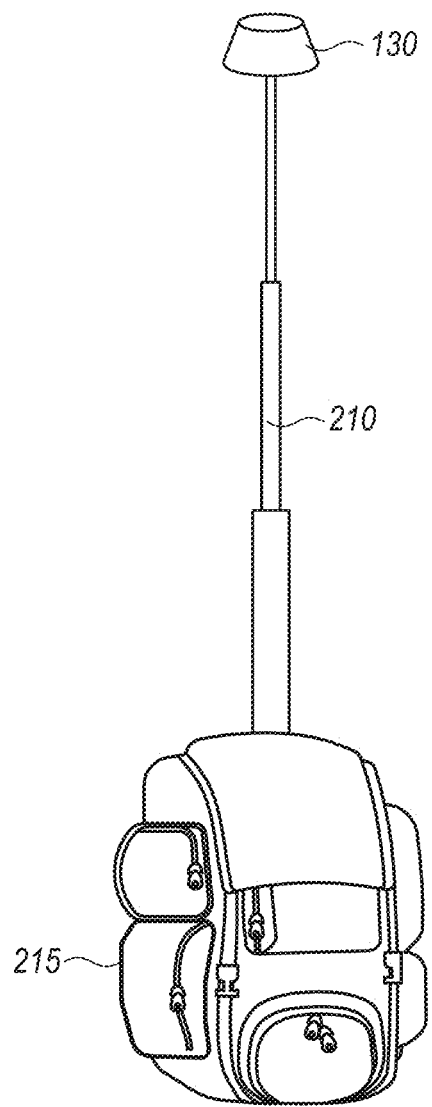
FIG. 2B can be a diagram, which can show a backpack alternative embodiment of the RF sensing component for the system of FIG. 1.
Figure 2C:
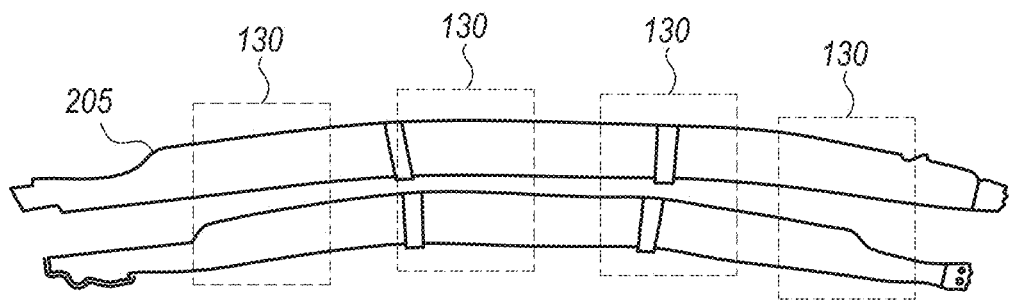
FIG. 2C can be a diagram, which can show an alternative belt embodiment of the RF sensing component for the system of FIG. 1.

As shown in FIGS. 1-2C, the antennas 130 in antenna array 135 can be mounted on a wearable device, such as a helmet 200 in FIG. 2A, to enable an end user to operate hands free. In some embodiments, the antenna array 135 may comprise at least four antennas 130 that can be arranged to provide omni-directional, 360-degree coverage. In other embodiments, the antennas can be arranged as an array 135 mounted on a belt 205 (FIG. 2B), and worn as a belt 205. In still other embodiments, and as shown in FIG. 2C the antenna 130 can be telescopically mounted on a telescoping pole 210, which can be attached to the inside surface of the enclosure formed by backpack 215. The pole 210 can be extended to elevated antenna 130 above the user during operation, to provide 360-degree coverage that can be somewhat extended due to the increased working height of the antenna 130. When retracted, the pole 210 and antenna 130 can be stowed and enclosed securely within backpack 215.

Figure 3A:
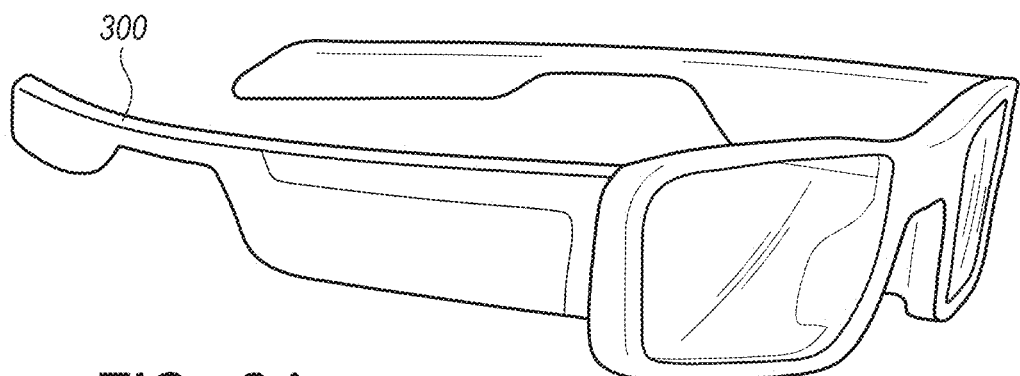
FIG. 3A can show an alternative augmented reality (AR) glasses embodiment for the visualization element for the systems of FIG. 1 than the AR visor embodiment depicted in FIG. 2A.

In some embodiments, visualization element 115 can be visor 305 that can be attached to a helmet 200, as shown in FIG. 2A, and signal-processing module 110 can be attached to the helmet 200 or elsewhere on the end user's clothing. In other embodiments, AR glasses 300 such as those seen in FIG. 3A can be used. In FIG. 3A, Vuzix300 AR glasses made by VUZIX® are shown, but other AR glasses could certainly be used. For these and other embodiments, signal-processing module 110 can be attached to AR glasses 300, or to belt 205, or to backpack 215, or elsewhere on the end user's clothing, provided RF sensing component 105, signal-processing module 110 and visualization element 115 are in wireless communication with each other for transfer of data.

Referring again to FIG. 1, once received at receiver 140, the signal 120 can be input to signal-processing module 110. As shown in FIG. 1, signal-processing module 110 can include a software defined radio 330. As used herein, "software defined radio" can be thought of as a radio where components that have been traditionally implemented in hardware (e.g. mixers, filters, amplifiers, modulators/demodulators, detectors, etc.) are instead implemented by means of software as predetermined by the end user to receive the RF signal 120 from emitter 125. As disclosed herein, SDR 330 is programmed for reception of signals in the cell phone/wireless network RF range. However, other settings are certainly possible, depending on the frequency of interest to the end user. The Wi-Fi signals can be identified with minimal processing to obtain service set identification (SSID) information (The SSID is a case-sensitive text string that can be as long as 32 characters consisting of letters and/or numbers.) using the aforementioned software defined radio 330.

Signal-processing module 110 can also include a software controller 335. Software defined radio 330 and software controller 335 can pass network information back and forth, as indicated by arrows 340a, 340b. The software controller 335 can parse all received emitter information to determine if the detected signals 120 originated from multiple transmitters, or if the same sign 120 was detected by different antennas 120 due to either the emitter 125 moving relative to the user, of the user moving while the emitter 125, or both.

The parsed information can be output to geolocation algorithm processor 350 via arrow 355, as shown in FIG. 1. As also shown, geolocation algorithm processor 350 can input precise signal identification and localization information back to software controller 335, as shown by arrow 360.

As mentioned above, software controller 335 can receive the RF signal data from SDR 330, and can convert into a vector field visualization for output to visualization processor 370. Vector field visualization has long been performed to assist in the comprehension of complex four dimensional (4D) behaviors. These techniques have been applied to visualize electromagnetic fields, weather patterns and airflow across airfoils. It is believed that the development of vector field visualizations from sampled, real world data can be a novel application in the augmented reality (AR) field.

Further, if the same RF signal 120 is received by the different antennas as mentioned above, the software controller 335 can take lines of bearing information as captured by the different antennas 130 and passed through SDR 330 via receiver 140, to triangulate the position of emitter 125. Alternatively, if only one signal line of bearing is provided, the software controller 335 can monitor the change in line of bearing over time as received by different antennas 130 sequentially, and due to an increase/decrease in SNR, to determine the position (localization information0 of the emitter. If the end user is close enough to the emitter 125, and the signal 120 is above a predetermined threshold, the signal-to-noise (SNR) ratio for signal 120 can be determined, can be converted into localization information, and can be output to visualization element 115 for display to the user.

The systems and methods according to several embodiments can also include a visualization element 115, as shown in FIG. 1. As mentioned above, visualization element 115 can receive the relative XYZ coordinates for signal location as an input (arrow 380) from visualization processor 370 of signal-processing module 110, and can further provide user localization information back to locator 375 of component 110, as indicated by arrow 390. Visualization processor 370 can take the localization information, and can convert to a position on the display for visualization element 115, so that if the user turns his/her head, the location of the signal relative to the end user remains correct in the user's field of vision.

The software controller 335 can be configured to feed the geolocation algorithm processor 350 with the antenna pointing information and parsed transmitter identification for geolocation processing. Once the geolocation algorithm processor 350 has refined the geolocation down to a predetermined accuracy level, the software controller 335 can send the specific signal identification and localization information to the visualization processor as shown by arrow 380.

The visualization processor 370 can be configured to create the XYZ coordinates for the signal location relative to the visualization element glasses 300 (FIG. 3A) or visor 305 (FIG. 2C) pointing angles. The visualization processor can also be configured to send that information to the visualization element 115, such as shown by arrow 380. Subsequently, the user of the visualization system will then see the RF emitters' location along with network information (e.g. SSID information) within their visual range. The user should be able to correctly identify each emitter within their operating field-of-view (FOV) and relative to the user's location (the system 100 location, since the system 100 is being worn by the user). Locator 345 can provide user antenna pointing and user localization information by software controller 335, as shown by arrow 385 in FIG. 1.

Figure 3B:
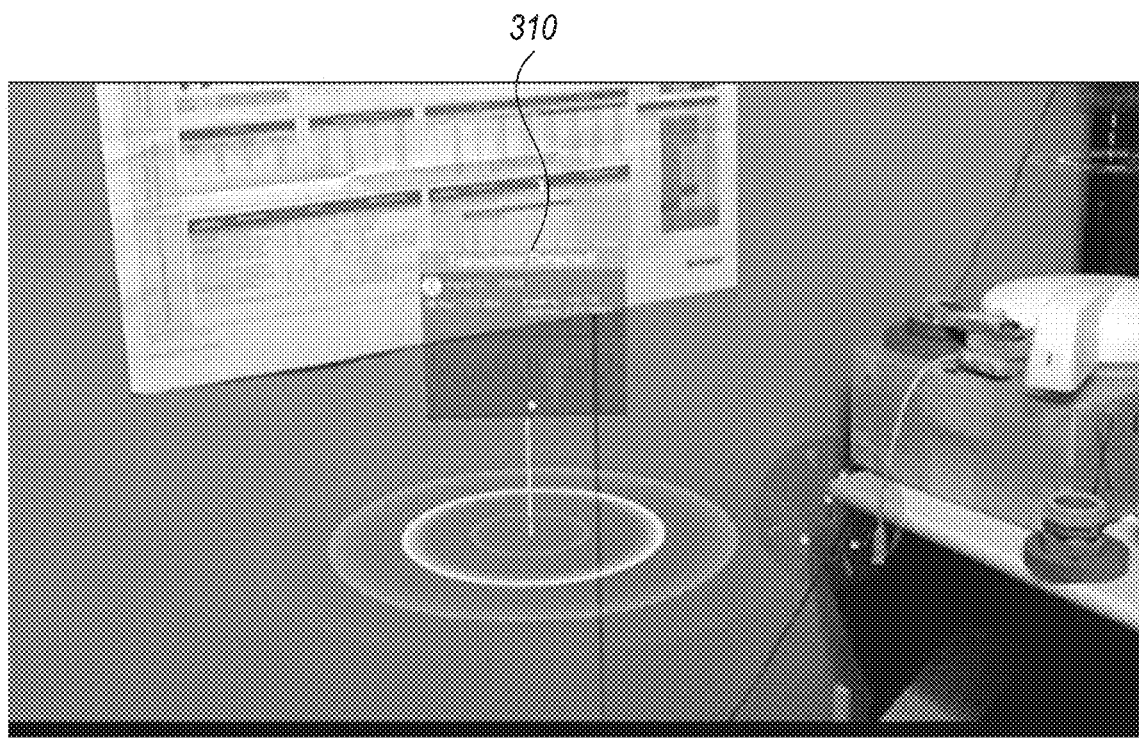
FIG. 3B can show AR superimposition of output localization information onto the end user's field of vision for the embodiments shown in FIGS. 2A and 3A; and, FIG. 4 can be a block diagram, which can show a flowchart of an embodiment of a method in accordance with some of the embodiments for the systems and methods of the present invention, as disclosed herein.

One goal of the present invention can be to have a portable system which would allow the user to walk around and refine geolocation of RF transmitters in a hand-free fashion, using an algorithm that can continually resample the signal 120 RF SOI to include signal to noise ratio and the location of the user. The algorithm is getting this information from multiple sources. For example, it receives the signal to noise ratio from an external receiver and the user localization information from global positioning satellites (GPS) and the HOLOLENS® pointing angles, where glasses are HOLOLENS® AR glasses manufactured by MICROSOFT®. As shown in FIG. 3B, AR "pop-up" 310 can appear in the end user field of view, pop-up 310 describe the localization information to the end user for viewing, without requiring the end user to look away at another alternate screen.

Another goal of the methods and systems can be to create an overall system 100 that can be as modular as possible, due to fluctuating military requirements, available equipment, desired frequency(ies) of interest and other design considerations. To facilitate this modularity system can be designed so that software defined radio 330, AR glasses 300 and other portions of system 100 could be substituted out for upgrades, or for different components having new or upgraded capability. To accomplished this, visual rendering for the AR glasses 300 can be done primarily using UNITY® software by Unity Technologies, which can be an all-purpose game engine and development tool. Other tools could be used. To ease the development of networking gaming software, UNITY® contains a sophisticated networking subsystem that can ensure timely delivery and proper syncing of networking traffic. However, the requirement for this was that each end of the communication had to be running the UNITY® networking code. In addition, the networking checks the subsystem provided to ensure timely and synchronous delivery added to processing power needs and reduced performance in delivering the networking data to the appropriate nodes.

Between these issues and others, prior art subsystems were unable to accomplish the following provide design parameters in their entirety: 1) Speed is paramount over an extremely large set of data; 2) The transport of such large sets of data should be as simple as possible to save CPU cycles; 3) An optimum system device should be tolerant to dropped communication packets (assured communication not required); 4) As the source node is the same across all users, individual tracking of data for users is built into the higher order Application/Presentation/Session layers, and not the Transport Layer (as used herein, application layer, presentation layer, session layer, and transport layer can have the meanings as found in the Open Systems Interconnection model (OSI) conceptual model); and, 5) The networking subsystem must be platform and application agnostic to apply to arbitrary connection points and equipment.

For the present invention, the simplest communication method to accomplish the above advantages, User Datagram Protocol (UDP) over IPv4 layer, served the best. However, there was no prebuilt means of creating a simple UDP socket in UNITY® or other HOLOLENS® toolsets. No known library repository and general prior art searches for such code that might have been created by a third party were found. Thus, the systems and methods, can include the creation of a higher order library extension, which can implements the creation, servicing, and usage of a UDP socket on a visualization elements (in this case, AR glasses 300). With this configuration, if and when one of the RF sensing component 105, signal-processing module 110 and/or visualization element 115 is substituted out, the system 100 can easily compensate by simply unplugging the old one and plugging in the new one because of the designed method of data transport described above. Thus, the modular nature of the system 100 can allow for efficient substitution of software defined radio 330, RF sensing component 105, AR headset (or AR glasses 330), and even the geolocation algorithm used by controller 330/processor 350 can be swapped out depending on what the use case or target it, and each module can be quickly configured upon starting up the system 100.

Figure 4:
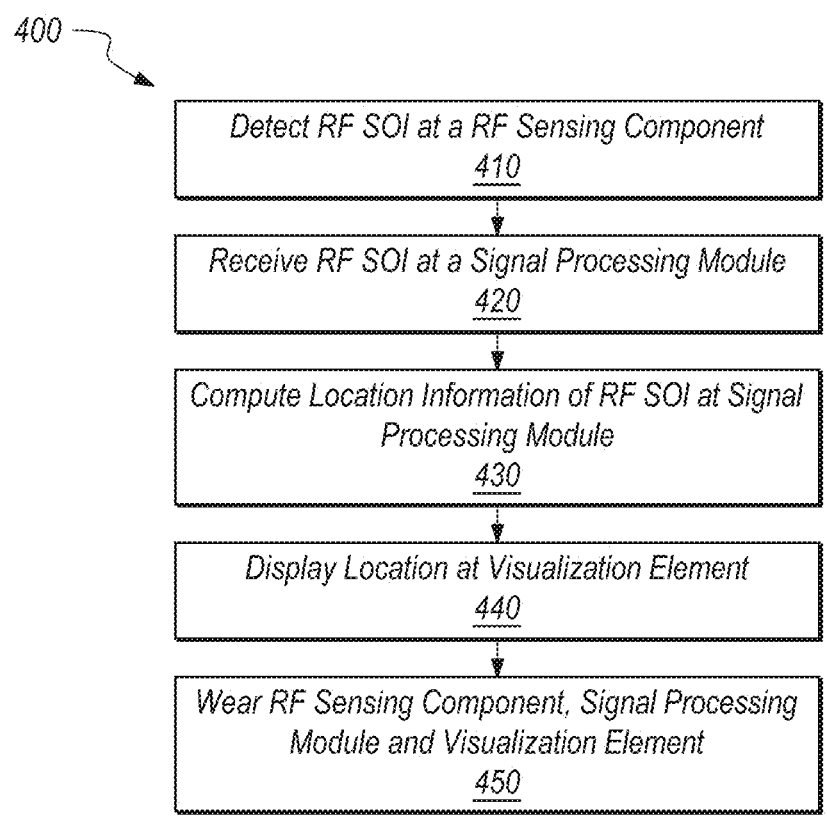

FIG. 4 can show a flowchart of an embodiment of a method 400 in accordance with the disclosed embodiments. Some or all of the steps of method 400 may be performed by a system such as system 100 shown in FIG. 1 incorporating the components shown in system 100 in FIGS. 1-3A. As shown, the methods 400 can include the initial step 410 of detecting the RF SOI at RF sensing component 105. The methods can further include the step 420 of receiving the detected RF SOI at the signal-processing module 110, and computing localization information for the RF SOI at step 430. The methods according to several embodiments can further include step of displaying the determined localization information at the visualization element 115, as indicated by box 440 in FIG. 4. To allow for portability, the methods can include the step of wearing the RF sensing component 110, the signal-processing module 110 and the visualization element 115, as shown by step 450. The methods can be accomplished in a hands free manner, using the structure and cooperation of structure cited above.

The disclosed embodiments provide a system and method to allow users to localize electromagnetic radiation emissions, such as RF emissions, while maintaining situational awareness without distracting the user's focus on peripheral devices such as laptops or handheld devices. The disclosed embodiments provide for the display of electromagnetic radiation emission information and signal direction finding data in an augmented reality display, providing users greater maneuverability than currently existing techniques. Additionally, by combining signal recognition, geolocation, and an augmented reality display, users with little or no signal knowledge acquisition experience will be able to locate electromagnetic radiation emissions via a hands free survey of their environment. As an example, the detected electromagnetic radiation emissions will be displayed within the augmented reality display overlaid on the visual of the user's current operating environment.

In general, the disclosed embodiments utilize an augmented reality display coupled with a portable signal collection and direction finding system that, as an example, may be contained within a backpack or other portable carrying container. The processing system may be configured to process and display electromagnetic radiation signal data in the visual range so that the system operator can easily determine source and azimuth of nearby emissions. In some embodiments, the system is configured to detect RF emissions, such as emissions in the Wi-Fi band. However, the disclosed embodiments may be configured to detect electromagnetic radiation emissions in other frequency bands of interest across the electromagnetic spectrum. Further, the disclosed embodiments are not limited in types of electromagnetic radiation signals that may be detected or by the operating environment (e.g. urban/rural).

While FIG. 4 shows one embodiment of method 400 including steps 410-450, other embodiments of method 400 may contain fewer steps or more steps. Further, while in some embodiments the steps of method 400 may be performed as shown in FIG. 4, in other embodiments the steps may be performed in a different order, or certain steps may occur simultaneously with one or more other steps. Still further, some of the steps may contain more detailed substeps. For example, step 420 can be accomplished in part by using a software defined radio 330 to receive the RF SOI (step 410), as shown by the block diagram in FIG. 1. The computing localization information at step 430 can be accomplished by software controller 335 using antenna pointing information from locator 375, and parsed transmitter ID information from geolocation algorithm processor 350.

Some or all of the steps of method 400 may be stored on a non-transitory processor readable storage medium, wherein the steps are represented by processor readable programming code. The steps of method 400 may also be processor-implemented using a programmable device, such as a processor-based system. Method 700 may comprise instructions that, when loaded into a processor-based system, cause the system to execute the steps of method 400. Method 400 may be implemented using various programming languages, such as "Java", "C", or "C++". Different processors for software controller 335, visualization processor 370, geolocation algorithm processor 350 and signal-processing module 110 can be provided. Or, the software controller 335, geolocation algorithm processor 350 and visualization processor 370 functions for the present invention can all be accomplished by a single processor.

Various storage media, such as magnetic processor disks, optical disks, and electronic memories, as well as processor readable media and processor program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a processor disk containing appropriate materials, such as a source file, an object file, or an executable file, were provided to a processor, the processor could receive the information, appropriately configure itself, and perform the functions of the various systems and methods outlined in the diagrams and flowcharts above to implement the various functions. That is, the processor could receive various portions of information from the disk relating to different elements of the above-described systems and/or methods, implement the individual systems and/or methods, and coordinate the functions of the individual systems and/or methods.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" or "connected" or "attached" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other such as communicating in a wireless manner, for example. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

What is claimed is:

1. A radiofrequency (RF) localization system, comprising:
    an RF sensing component for receiving an RF signal of interest (SOI);
    a signal-processing module, said signal-processing module receiving said RF SOI and computing localization information for said RF SOI;
    a visualization element for receiving said localization information as an input and displaying said localization information in an end user field of view (FOV); and,
    said RF sensing component, said signal-processing module and said visualization element being adapted for wearing by said end user, to allow for hands free operation of said RF localization system.

2. The system of claim 1, wherein said RF sensing component further comprises:
    a helmet; and,
    a plurality of RF antennas arranged on said helmet as an array to provide omni-directional coverage for reception of said RF SOI.

3. The system of claim 1, wherein said RF sensing component further comprises:
    a belt; and,
    a plurality of RF antennas arranged on said belt as an array to provide omni-directional coverage for reception of said RF SOI.

4. The system of claim 1, wherein said RF sensing component further comprises:
    a backpack defining an enclosure;
    a telescopic pole having a first end and a second end, said first end attached to said backpack within said enclosure;
    at least one RF antenna mounted to said second end; and,
    said telescopic pole and said at least one RF antenna being completely enclosed within said enclosure when said telescopic pole is retracted, and said at least one RF antenna being located above said end user for providing omni-directional coverage for reception of said RF SOI when said telescopic pole is extended.

5. The system of claim 2, wherein said visualization element is an augmented reality (AR) visor mounted on said helmet, and said signal-processing module is mounted on said helmet.

6. The system of claim 3, wherein said visualization element is an augmented reality (AR) glasses, and said signal-processing module is mounted on said helmet.

7. The system of claim 1, wherein said signal-processing module is determining said localization information using a software defined radio for determining (SSID) information from said RF SOI, using a computer program selected from the group consisting of GNU Radio and REDHAWK®.

8. The system of claim 1, wherein said signal-processing module includes a visualization processor, said visualization processor providing an output to said visualization element using vector field visualization.

9. A method for localization of a radiofrequency (RF) signal of interest (SOI) by an end user, said method comprising the steps of:
    A) sensing said RF SOI with an RF component;
    B) receiving said RF SOI at a signal-processing module;
    C) computing localization information for said RF SOI at said signal-processing module;
    D) displaying said localization information at a visualization element;
    E) wearing said RF component; said signal-processing module and said visualization element; and,
    said steps A) though D) being accomplished by said end user in a hands free manner.

10. The method of claim 9, wherein said step E) is accomplished using an RF sensing component further comprising a helmet and a plurality of RF antennas arranged on said helmet as an array to provide omni-directional accomplishment of said step B).

11. The method of claim 9, wherein said step E) is accomplished using an RF sensing component that further comprises a belt and a plurality of RF antennas arranged on said belt as an array to provide omni-directional accomplishment of said step B).

12. The method of claim 9, wherein said step E) is accomplished using an RF sensing component that further comprises:
    a backpack defining an enclosure;
    a telescopic pole having a first end and a second end, said first end attached to said backpack within said enclosure;
    at least one RF antenna mounted to said second end; and,
    said telescopic pole and said at least one RF antenna being completely within said enclosure when said telescopic pole is retracted, and said at least one RF antenna being located above said end user for omni-directional accomplishment of said step B) when said telescopic pole is extended.

13. The method of claim 10, wherein said step E) is further accomplished using a said visualization element that is an augmented reality (AR) visor mounted on said helmet, and said signal-processing module is mounted on said helmet.

14. The method of claim 9, wherein said step E) is further accomplished using a said visualization element that is an augmented reality (AR) glasses, and said signal-processing module is mounted on said helmet.

15. The method of claim 9, wherein said step C) is accomplished using a software defined radio for determining (SSID) information from said RF SOI using a computer program selected from the group consisting of GNU Radio and REDHAWK®.

16. The method of claim 9, wherein said step D) is accomplished by a signal-processing module that includes a visualization processor so that said visualization processor providing an output to said visualization element using vector field visualization.

17. A method comprising the steps of:
using an antenna array disposed on a wearable device to receive a plurality of wireless communication signals;
obtaining network information from the plurality of wireless communication signals;
using a software controller disposed on the wearable device to parse emitter information from multiple transmitters from the network information;
receiving, at the software controller, antenna pointing information and user localization information from the wearable device;
transmitting, from the software controller to a geolocation algorithm processor, the antenna pointing information and parsed transmitter identification for processing by the geolocation algorithm processor to determine a geolocation;
transmitting, from the software controller to a visualization processor, specific signal identification information and localization information;
determining, using the visualization processor, xyz coordinates for the signal location relative to the antenna pointing information;
transmitting the xyz coordinates to the wearable device; and
displaying, using the wearable device, the RF emitter's localization information along with network information within the field of view of a user wearing the wearable device.

18. The method of claim 17, wherein wearable device includes a helmet and a visor attached to said helmet, wherein said antenna array is mounted on said helmet, and wherein the localization information is displayed in an augmented reality (AR) format.

19. The method of claim 17, wherein wearable device includes a backpack and glasses, wherein said antenna array is telescopically disposed within said backpack to selectively extend therefrom, and herein the localization information is displayed on the glasses in an augmented reality (AR) format.

20. The method of claim 17, wherein wearable device includes a belt and glasses, wherein the antenna array is mounted on the belt, and wherein the localization information is displayed on the glasses in an augmented reality (AR) format.

\* \* \* \* \*